United States Patent
Yang et al.

(10) Patent No.: US 11,985,345 B2
(45) Date of Patent: *May 14, 2024

(54) DEVICE AND METHOD FOR CODING VIDEO DATA

(71) Applicant: FG Innovation Company Limited, Tuen Mun (HK)

(72) Inventors: Yu-Chiao Yang, Taipei (TW); Chih-Yu Teng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,609

(22) Filed: Sep. 14, 2022

(65) Prior Publication Data
US 2023/0007293 A1 Jan. 5, 2023

Related U.S. Application Data

(63) Continuation of application No. 17/206,560, filed on Mar. 19, 2021, now Pat. No. 11,622,122.
(Continued)

(51) Int. Cl.
*H04N 19/46* (2014.01)
*H04N 19/172* (2014.01)
(Continued)

(52) U.S. Cl.
CPC ........... *H04N 19/46* (2014.11); *H04N 19/172* (2014.11); *H04N 19/176* (2014.11); *H04N 19/184* (2014.11); *H04N 19/513* (2014.11)

(58) Field of Classification Search
CPC ....... H04N 19/46; H04N 19/70; H04N 19/513
See application file for complete search history.

(56) References Cited

U.S. PATENT DOCUMENTS

2021/0377561 A1* 12/2021 Zhang .................. H04N 19/184

FOREIGN PATENT DOCUMENTS

| CA | 3091190 A1 | 8/2019 |
| JP | 2023517085 A | 4/2023 |
| WO | 2021180166 A1 | 9/2021 |

OTHER PUBLICATIONS

Series H: Audiovisual and Multimedia Systems Infrastructure of audiovisual services—Coding of moving video, "High efficiency video coding", ITU-T H.265 (Dec. 2016).
(Continued)

*Primary Examiner* — Kyle M Lotfi
(74) *Attorney, Agent, or Firm* — ScienBiziP, P.C.

(57) ABSTRACT

A method of encoding video data by an electronic device is provided. The electronic device determines whether an affine enabled flag corresponding to one or more image frames included in the video data is true. The electronic device determines a maximum number of zero or more subblock-based merging motion vector prediction candidates corresponding to the one or more image frames when the affine enabled flag is true. The maximum number is in a number range of K to N, N being a first integer and K being a second integer less than N. The electronic device determines that a maximum index is in an index range of 0 to N-K and generated by subtracting the maximum number from N when the affine enabled flag is true. An index value of the maximum index is in an index range of 0 to N-1 when K is 1.

10 Claims, 8 Drawing Sheets

Related U.S. Application Data

(60) Provisional application No. 62/992,092, filed on Mar. 19, 2020.

(51) Int. Cl.
*H04N 19/176* (2014.01)
*H04N 19/184* (2014.01)
*H04N 19/513* (2014.01)

(56) References Cited

OTHER PUBLICATIONS

Non-Final Rejection dated Dec. 15, 2021 for U.S. Appl. No. 17/206,560 which is the parent application of the instant application.

Notice of Allowance dated Jul. 12, 2022 for U.S. Appl. No. 17/206,560 which is the parent application of the instant application.

Olena Chubach et al., "CE4-related: On maximum number of subblock-based merging candidates", Joint Video Experts Team (JVET) of ITU-T SG 16 WP 3 and ISO/IEC JTC 1/SC 29/WG 11 16th Meeting: Geneva, CH, Oct. 1-11, 2019, JVET-P0152-v1, Oct. 4, 2019, pp. 1-2.

Yu (Ericsson) R et al.: "Non-CE4: On maximum number of subblock merge candidates", JVET-O0220, Joint Video Experts Team (JVET) of ITU-T SG 16 WP 3 and ISO/IECJTC 1/SC 29/WG11, 15th Meeting: Gothenburg, SE, Jul. 3-12, 2019 (Jun. 24, 2019).

Y-J Chang (Qualcomm) et al.: "Non-CE4: On MMVD signaling", JVET-N0448, Joint Video Experts Team (JVET) of ITU-T SG 16 WP 3 and—ISO/IECJTC 1/SC 29/WG11, 14th Meeting: Geneva, CH, 19 Mar. 27, 2019 (Mar. 20, 2019).

Xu (Tencent) X et al.: "CE2/4-related: Unified merge list size for block and sub-block merge modes", JVET-M0406-vl, Joint Video Exploration Team (JVET) of ITU-T SG 16 WP 3 and ISO/IEC JTC 1/SC 29/WG11, 13th Meeting: Marrakesh, MA, Jan. 9-18, 2019 (Jan. 3, 2019).

\* cited by examiner

DEVICE AND METHOD FOR CODING VIDEO DATA

CROSS-REFERENCE TO RELATED APPLICATION(S)

This application is a continuation application of U.S. patent application Ser. No. 17/206,560, filed on Mar. 19, 2021, which claims the benefit of and priority to U.S. Provisional Patent Application Ser. No. 62/992,092, filed on Mar. 19, 2020. The contents of all of the above-mentioned applications are hereby incorporated herein fully by reference in their entirety.

FIELD

The present disclosure is generally related to video coding and, more specifically, to techniques for using a high-level syntax to determine a number of merging candidates.

BACKGROUND

In a conventional video coding method, an encoder may encode video data to generate encoded data having a plurality of flags and a plurality of indices and provide the encoded data to a decoder. The flags may indicate whether a plurality of coding modes is enabled or not. For example, the encoded data may include an affine enabled flag indicating whether an affine mode is enabled for some of the image frames. In addition, the indices may indicate maximum numbers of the mode candidates for the coding modes.

Although the encoded data can include a flag and an index for each of the coding modes in each different level syntax element, the coding efficiency may be decreased. Therefore, the encoder and the decoder need to have a method for more efficiently using the flags and the indices to prevent a number of bits in the encoded data from increasing too much.

SUMMARY

The present disclosure is directed to a device and method for using a high-level syntax to determine a number of merging candidates.

In a first aspect of the present disclosure, a method for decoding a bitstream and an electronic device for performing the method are provided. The method includes receiving the bitstream; determining an affine enabled flag corresponding to one or more image frames from the bitstream; determining a maximum index corresponding to the one or more image frames from the bitstream when the affine enabled flag is true, wherein an index value of the maximum index is in an index range of 0 to N-K, N being a first integer and K being a second integer less than N; determining a maximum number of zero or more subblock-based merging motion vector prediction (MVP) candidates based on the maximum index when the affine enabled flag is true; and reconstructing the one or more image frames based on the maximum number of zero or more subblock-based merging MVP candidates.

In a second aspect of the present disclosure a method for decoding a bitstream and an electronic device for performing the method are provided. The method includes receiving the bitstream; determining a maximum index corresponding to one or more image frames from the bitstream, wherein an index value of the maximum index is in an index range of 0 to N-K, N being a first integer and K being a second integer less than N; determining a maximum number of zero or more subblock-based merging motion vector prediction (MVP) candidates by subtracting the index value of the maximum index from N; and reconstructing the one or more image frames based on the maximum number of zero or more subblock-based merging MVP candidates.

In a third aspect of the present disclosure, a method of encoding video data and an electronic device for performing the method are provided. The method includes receiving the video data; determining whether an affine enabled flag corresponding to one or more image frames included in the video data is true; determining a maximum number of zero or more subblock-based merging motion vector prediction (MVP) candidates corresponding to the one or more image frames when the affine enabled flag is true, wherein the maximum number of the zero or more subblock-based merging MVP candidates is in a number range of K to N, N being a first integer, and K being a second integer less than N, and the maximum number of the zero or more subblock-based merging MVP candidates is in a number range of 1 to N when K is 1; determining that a maximum index is in an index range of 0 to N-K and generated by subtracting the maximum number of the zero or more subblock-based merging MVP candidates from N when the affine enabled flag is true, wherein an index value of the maximum index is in an index range of 0 to N-1 when K is 1; and signaling the maximum index into a bitstream for the video data.

In an implementation of the third aspect, N is five.

In an implementation of the third aspect, the affine enabled flag and the maximum index are signaled in a sequence parameter set (SPS) of the bitstream, each of the one or more image frames is reconstructed based on the SPS, and at least one of the one or more image frames is reconstructed based on a picture header of the bitstream.

In an implementation of the third aspect, the maximum number is in a number range of K to N when K is different from 1.

In a fourth aspect of the present disclosure a method of encoding video data and an electronic device for performing the method are provided. The method includes receiving the video data; determining a maximum number of zero or more subblock-based merging motion vector prediction (MVP) candidates corresponding to one or more image frames included in the video data, wherein the maximum number of the zero or more subblock-based merging MVP candidates is in a number range of K to N, N being a first integer, and K being a second integer less than N; determining a maximum index by subtracting the maximum number of the zero or more subblock-based merging MVP candidates from N, wherein the maximum number of the zero or more subblock-based merging MVP candidates is in a number range of 1 to N and an index value of the maximum index is in an index range of 0 to N-1 when K is 1; and signaling the maximum index into a bitstream for the video data.

An implementation of the fourth aspect further includes determining an affine enabled flag corresponding to the one or more image frames, wherein the maximum index is signaled into the bitstream when the affine enabled flag is true.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
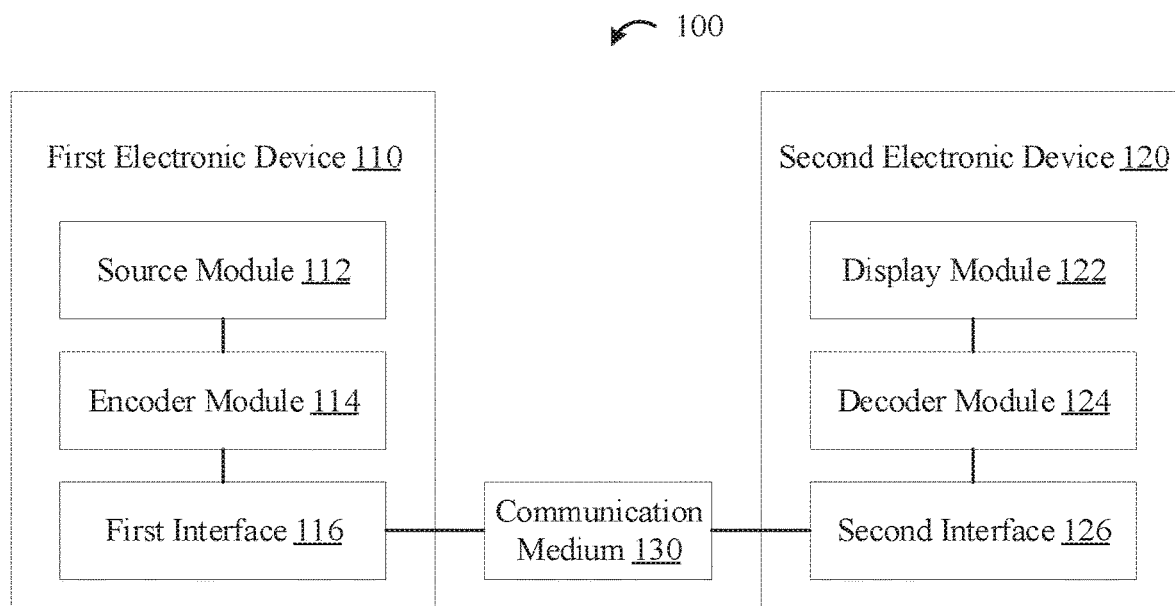
FIG. 1 is a block diagram illustrating a system configured to encode and decode video data, according to an implementation of the present disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purpose of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," may refer to one or more of the same or different implementations. The term "coupled" is defined as connected, whether directly or indirectly through intervening components, and is not necessarily limited to physical connections. The term "comprising" means "including, but not necessarily limited to," and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will immediately recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having computer-executable instructions stored on a computer-readable medium, such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware or as hardware or combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram illustrating a system 100 configured to encode and decode video data, according to an implementation of the present disclosure. The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and to decode encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include more or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphic processing unit (GPU), a system on chip (SoC), digital signal processors (DSPs), application-specific integrated circuits (ASICs), field programmable gate arrays (FPGAs), discrete logic, software, hardware, firmware, or any combination thereof When implemented partially in software, a device may store the program having instructions for the software in a suitable, non-transitory computer-readable medium and execute the instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

The display module 122 may include a display using liquid crystal display (LCD) technology, plasma display technology, organic light-emitting diode (OLED) display technology, or light-emitting polymer display (LPD) technology with other display technologies used in other implementations. The display module 122 may include a high-definition display or an ultra-high-definition display.

Figure 2:
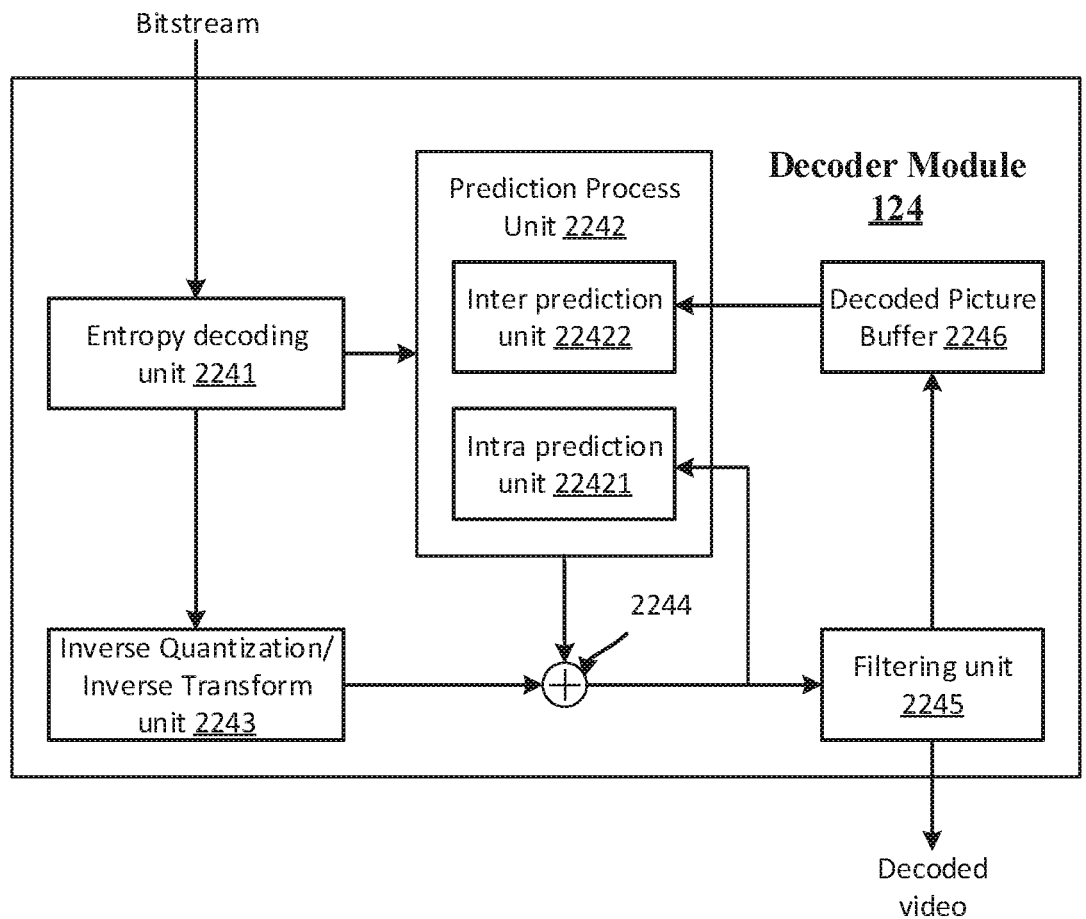
FIG. 2 is a block diagram illustrating the decoder module of an electronic device illustrated in FIG. 1, according to an implementation of the present disclosure.

FIG. 2 is a block diagram illustrating the decoder module 124 of an electronic device 120 illustrated in FIG. 1, according to an implementation of the present disclosure. The decoder module 124 includes an entropy decoder (e.g., entropy decoding unit 2241), a prediction processor (e.g., prediction process unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction process unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements such as motion vectors, intra modes, partition information, and other syntax information from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

During the decoding process, the prediction process unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the chroma components are reconstructed by the prediction process unit 2242.

The intra prediction unit 22421 may reconstruct a plurality of chroma components of the current block unit based on the plurality of luma components of the current block unit when the luma components of the current block are reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block.

The motion vector may indicate a displacement of the current block unit within the current image block relative to a reference block unit within the reference image block. The reference block unit is a block determined to closely match the current block unit.

The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as discrete cosine transform (DCT), discrete sine transform (DST), adaptive multiple transform (AMT), mode-dependent non-separable secondary transform (MDNSST), hypercube-givens transform (HyGT), signal-dependent transform, Karhunen-Loeve transform (KLT), wavelet transform, integer transform, subband transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
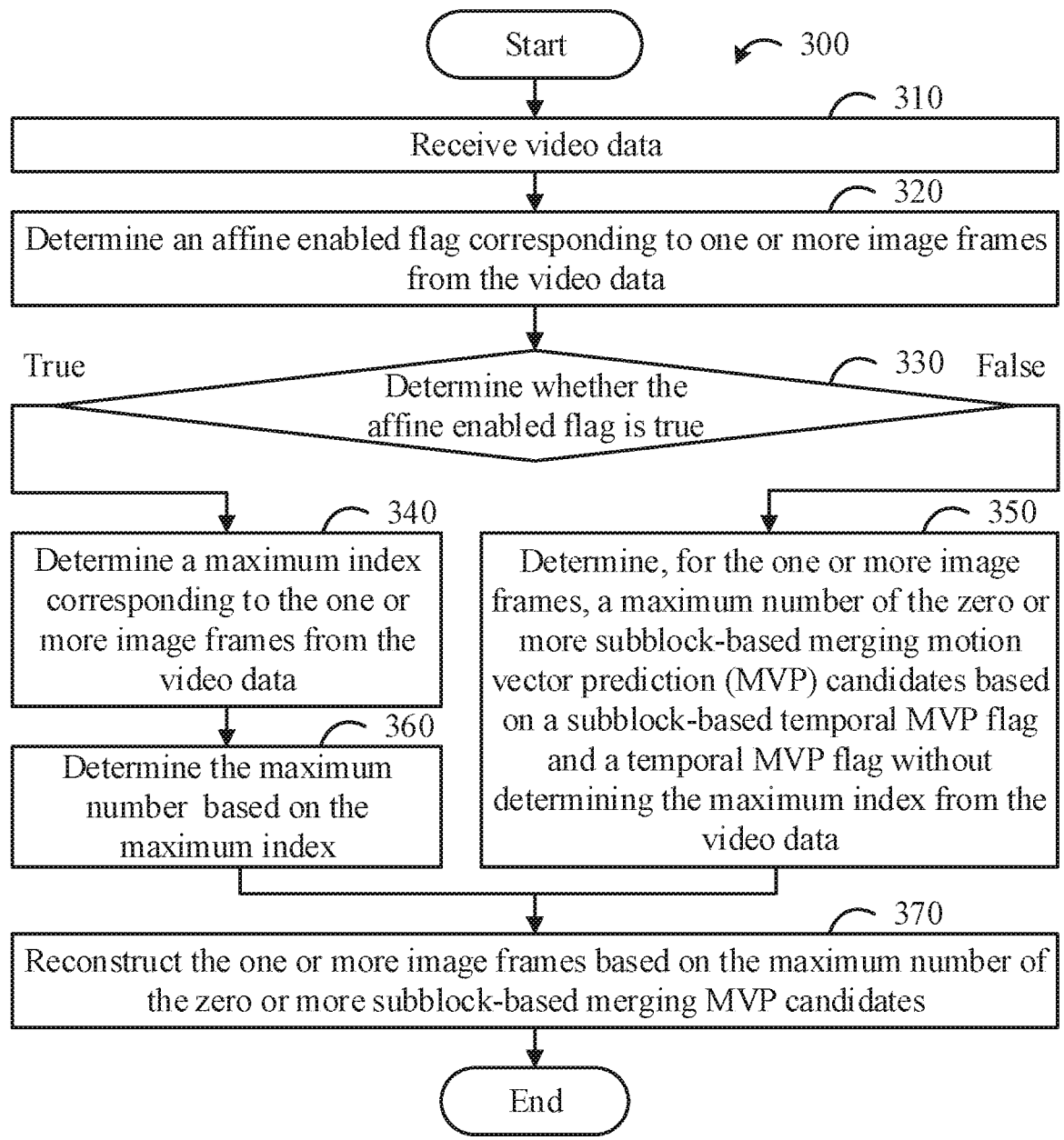
FIG. 3 is a flowchart illustrating a method for decoding video data by an electronic device, according to an implementation of the present disclosure.

FIG. 3 is a flowchart illustrating a method 300 for decoding video data by an electronic device, according to an implementation of the present disclosure. The method 300 is an example only, as there are a variety of ways to perform decoding of the video data.

The method 300 may be performed using the configurations illustrated in FIG. 1 and FIG. 2, and various elements of these figures are referenced with regard to the method 300. Each block illustrated in FIG. 3 may represent one or more processes, methods, or subroutines performed.

The order of blocks in FIG. 3 is illustrative only and may change. Additional blocks may be added or fewer blocks may be utilized without departing from the present disclosure.

At block 310, the decoder module 124 receives video data. The video data may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of video images. Then, the decoder module 124 may further reconstruct the plurality of video images based on the prediction indications and the partitioning indications. The prediction indications and the partitioning indications may include a plurality of flags and a plurality of indices.

At block 320, the decoder module 124 determines an affine enabled flag corresponding to one or more image frames from the video data. With further reference to FIG. 1 and FIG. 2, the decoder module 124 may determine the one or more image frames from the bitstream and determine a first parameter set corresponding to the one or more image frames.

The first parameter set may include a plurality of first prediction indications and a plurality of first partitioning indications. The bitstream may further include a second parameter set corresponding to one or more other image frames excluding the one or more image frames.

Both of the first parameter set and the second parameter set may be one of a video parameter set (VPS), a sequence parameter set (SPS), a picture parameter set (PPS), and a picture header (PH). For example, the affine enabled flag may be a flag sps_affine_enabled_flag when the affine enabled flag is included in the SPS. Each of the one or more image frames is reconstructed based on the SPS when the first parameter set is SPS.

The decoder module 124 may determine an affine enabled flag corresponding to the one or more image frames from the first parameter set of the bitstream. The affine enabled flag is used to determine whether an affine model-based motion compensation is enabled for the one or more image frames. A block-based syntax in the bitstream may further include a block-based affine flag for determining whether the affine model-based motion compensation is used for an image block divided from one of the one or more image frames when the affine enabled flag is equal to one. The affine model-based motion compensation may include affine merge prediction (having a plurality of affine merge candidates selected from a plurality of inherited affine merge candidates, a plurality of constructed affine merge candidates and at least one zero motion vectors (MVs) candidate), and affine advanced motion vector prediction (AMVP) prediction (having a plurality of affine AMVP candidates selected from a plurality of inherited affine AMVP candidates, a plurality of constructed affine AMVP candidates, a translational MVs candidate determined from neighboring blocks, and a zero MVs candidate).

At block 330, the decoder module 124 determines whether the affine enabled flag is true. The method 300 may proceed to block 340 when the decoder module 124 determines that the affine enabled flag is true. The method 300 may proceed to block 350 when the decoder module 124 determines the affine enabled flag is false.

The decoder module 124 determines that the affine enabled flag is true when the affine enabled flag is equal to one. The decoder module 124 determines that the affine enabled flag is false when the affine enabled flag is equal to zero.

The affine enabled flag is a flag vps_affine_enabled_flag when the affine enabled flag is included in VPS. The affine enabled flag is a flag sps_affine_enabled_flag when the affine enabled flag is included in an SPS. The affine enabled flag is a flag pps_affine_enabled_flag when the affine enabled flag is included in a PPS. The affine enabled flag is a flag ph_affine_enabled_flag when the affine enabled flag is included in a PH.

At block 340, the decoder module 124 determines a maximum index corresponding to the one or more image frames from the video data. With further reference to FIG. 1 and FIG. 2, the decoder module 124 may determine the maximum index from the first parameter set corresponding to the one or more image frames when the affine enabled flag is true. Therefore, the maximum index also corresponds to the one or more image frames. The maximum index is included in the SPS when the affine enabled flag is included in the SPS.

The maximum index is used to calculate a maximum number of zero or more subblock-based merging motion vector prediction (MVP) candidates when the affine enabled flag is true. The maximum number may be represented as MaxNumSubblockMergeCand. An index value of the maximum index may be in an index range of 0 to N1-K. The number N1 is a first integer and the number K is a second integer less than the number N1. The maximum index is an index sps_N1_minus_max_num_subblock_merge_cand when the maximum index is included in the SPS. The maximum index is an index sps_five_minus_max_num_subblock_merge_cand when the maximum index is included in the SPS and the number N1 is equal to 5. When the maximum index is included in the PPS and the number N1 is equal to 6, the maximum index is an index pps_six_minus_max_num_subblock_merge_cand.

The number K may be equal to zero or one. When the number K is equal to zero, the index value of the maximum index may be in an index range of 0 to 5. When the number K is equal to one, the index value of the maximum index may be in an index range of 0 to 4.

At block 350, the decoder module 124 determines, for the one or more image frames, the maximum number of the zero or more subblock-based merging MVP candidates based on a subblock-based temporal MVP (sbTMVP) flag and a temporal MVP (TMVP) flag without determining the maximum index from the video data.

The maximum number is calculated based on the sbTMVP flag and the TMVP flag without determining the maximum index from the video data when the affine enabled flag is false. The sbTMVP flag may be determined from the first parameter set corresponding to the one or more image frames. Therefore, the sbTMVP flag may also correspond to the one or more image frames.

The sbTMVP flag may be a flag sps_sbtmvp_enabled_flag included in the SPS when the affine enabled flag is included in the SPS. The TMVP flag may be determined from another level parameter set.

For example, the TMVP flag may be a flag ph_temporal_mvp_enabled_flag when the TMVP flag is included in the picture header corresponding to at least one of the one or more image frames. Therefore, the TMVP flag may correspond to the at least one of the one or more image frames.

The at least one of the one or more image frames is reconstructed based on the picture header corresponding to at least one of the one or more image frames.

The sbTMVP flag may be equal to one or zero, and the TMVP flag may be equal to one or zero. The maximum number MaxNumSubblockMergeCand may be equal to (the sbTMVP flag && the TMVP flag) when the affine enabled flag is false. The logical operator && is a Boolean logical "and" of two values. Therefore, the maximum number MaxNumSubblockMergeCand may be equal to one when the affine enabled flag is false and each of the sbTMVP flag and the TMVP flag is equal to one.

In other words, the maximum number MaxNumSubblockMergeCand may be equal to zero when the affine enabled flag is false and at least one of the sbTMVP flag and the TMVP flag is equal to zero. Therefore, when the affine enabled flag is false, the maximum number MaxNumSubblockMergeCand may be derived as follows:

MaxNumSubblockMergeCand=sps_sbtmvp_enabled_flag
&& ph_temporal_mvp_enable_flag

At block 360, the decoder module 124 determines the maximum number based on the maximum index. The maximum number may be calculated by subtracting the maximum index from the number N1 when the affine enabled flag is true. Therefore, the maximum number may be calculated by subtracting the maximum index from five, when the affine enabled flag is true and the number N1 is equal to 5. In other words, when the affine enabled flag is true and the number N1 is equal to 5, the maximum number MaxNumSubblockMergeCand may be derived as follows:

MaxNumSubblockMergeCand=5−sps_five_minus_max_num_subblock_merge_cand

The index value of the maximum index may be in the index range of 0 to N1-K, and the maximum number may be calculated by subtracting the maximum index from the number N1, when the affine enabled flag is true. Therefore, a value of the maximum number is in a value range of N1-(N1-K) to N1 (i.e., a value range of K to N1). The value of the maximum number is in a value range of 1 to N1, and the index value of the maximum index is in the index range of 0 to N1-1, when the affine enabled flag is true and the number K is equal to 1. The value of the maximum number may be in a value range of 0 to N1, and the index value of the maximum index is in an index range of 0 to N1, when the affine enabled flag is true and the number K is equal to 0. In addition, the value of the maximum number is in a value range of 1 to 5, and the index value of the maximum index is in an index range of 0 to 4, when the affine enabled flag is true, the number N1 is equal to 5, and the number K is equal to 1. The value of the maximum number may be in a value range of 0 to 5, and the index value of the maximum index is in an index range of 0 to 5, when the affine enabled flag is true, the number N1 is equal to 5, and the number K is equal to 0.

With reference to blocks 330-360 in FIG. 3, the maximum number MaxNumSubblockMergeCand may be derived as follows:

```
if( sps_affine_enabled_flag )
    MaxNumSubblockMergeCand = 5 − sps_five_minus_max_num_subblock_merge_cand
else
    MaxNumSubblockMergeCand
    = sps_sbtmvp_enabled_flag && ph_temporal_mvp_enabled_flag
```

The decoder module 124 may determine whether the maximum number is included in the value range. The decoder module 124 may determine that the video data is not in compliance with the decoder module 124 when the decoder module 124 determines that the maximum number is excluded from the value range.

Therefore, the decoder module 124 may output an error signal for the one or more image frames. In other words, the decoder module 124 may determine that the video data is in compliance with the decoder module 124 when the decoder module 124 determines that the maximum number is included in the value range. Therefore, the decoder module 124 may decode the bitstream to reconstruct the one or more image frames.

The decoder module 124 may determine whether the maximum index is included in the index range when the affine enabled flag is true. The decoder module 124 may determine that the video data is not in compliance with the decoder module 124 when the decoder module 124 determines that the maximum index is excluded from the index range. Therefore, the decoder module 124 may output an error signal for the one or more image frames. The above determination may be one of the bitstream conformance requirements in a video coding standard, such as versatile video coding (VVC).

In other words, the decoder module 124 may determine that the video data is in compliance with the decoder module 124 when the decoder module 124 determines that the maximum index is included in the index range. Therefore, the decoder module 124 may decode the bitstream to reconstruct the one or more image frames.

At block 370, the decoder module 124 reconstructs the one or more image frames based on the maximum number of the zero or more subblock-based merging MVP candidates. With further reference to FIG. 1 and FIG. 2, the decoder module 124 may select a prediction mode for each of a plurality of image blocks in the one or more image frames from a plurality of mode candidates including the zero or more subblock-based merging MVP candidates and determine a plurality of predicted blocks based on the prediction modes. The number of the zero or more subblock-based merging MVP candidates for each image block in the one or more image frames is restricted by the maximum number. Therefore, the decoder module 124 reconstructs the one or more image frames based on the zero or more subblock-based merging MVP candidates restricted by the maximum number. The zero or more subblock-based merging MVP candidates may include zero or more of a plurality of sbTMVP candidates, a plurality of affine merge prediction candidates, and at least one zero-padding candidate. The decoder module 124 may determine a plurality of residual components from the bitstream for each of the image blocks and add the residual components into a corresponding one of the predicted blocks to reconstruct the image blocks. The decoder module 124 may reconstruct all of the image frames for reconstructing the video images.

In a video coding standard, such as high efficiency video coding (HEVC) and VVC, a plurality of first search candidates of the subblock-based merging mode including the subblock-based merging MVP candidates may be more efficient than a plurality of second search candidates of the affine AMVP prediction. However, the number of the first search candidates of the subblock-based merging mode may be restricted by the maximum number MaxNumSubblockMergeCand. Therefore, due to an encoder complexity, the maximum number MaxNumSubblockMergeCand may be set to ensure that the subblock-based merging mode may not be disabled by the maximum number when the affine model-based motion compensation is enabled. Therefore, the maximum number MaxNumSubblockMergeCand will be greater than one when the number K is set to be greater than zero. There will be no condition that the maximum number is equal to zero to disable the subblock-based merging mode so the signaling of the maximum index will not be useless and wasted.

In order to decrease complexity, the subblock-based merging mode may be used when the affine enabled flag is true. The number K may be equal to one for changing the value range of the maximum number MaxNumSubblockMergeCand when the affine enabled flag is true. However, it is unnecessary to reserve a candidate for the subblock-based merging MVP candidates when the subblock-based merging mode has been already disabled due to any other methods. Therefore, the number K may be equal to zero to maintain the value range unchanged when the subblock-based merging mode is disabled. Thus, the number K may be set for the subblock-based merging mode.

Figure 4:
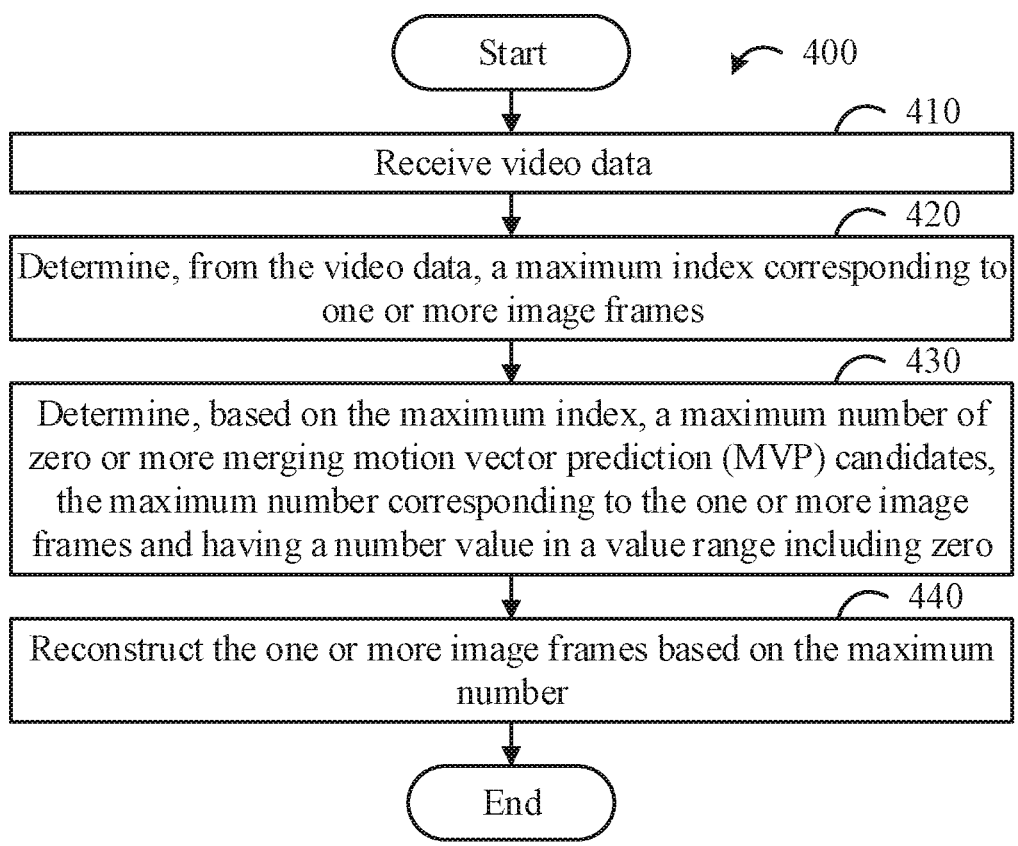
FIG. 4 is a flowchart illustrating a method for decoding video data by an electronic device, according to an implementation of the present disclosure.

FIG. 4 is a flowchart illustrating a method 400 for decoding video data by an electronic device, according to an implementation of the present disclosure. The method 400 is an example only, as there are a variety of ways to decode the video data.

The method 400 for decoding a bitstream and reconstructing a block unit may be performed using the configurations illustrated in FIG. 1 and FIG. 2, and various elements of these figures are referenced with regard to the method 400. Each block illustrated in FIG. 4 may represent one or more processes, methods, or subroutines performed.

The order of blocks in FIG. 4 is illustrative only and may change. Additional blocks may be added or fewer blocks may be utilized without departing from the present disclosure.

At block 410, the decoder module 124 receives video data. The video data may be a bitstream. With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

At block 420, the decoder module 124 determines, from the video data, a maximum index corresponding to one or more image frames. With further reference to FIG. 1 and FIG. 2, the decoder module 124 may determine the one or more image frames from the bitstream and determine a first parameter set corresponding to the one or more image frames. The bitstream may further include a second parameter set corresponding to one or more other image frames excluding the one or more image frames. Both of the first parameter set and the second parameter set may be one of a VPS, an SPS, a PPS, and a PH.

The decoder module 124 may determine the maximum index from the first parameter set corresponding to the one or more image frames. Therefore, the maximum index also corresponds to the one or more image frames. When the first parameter set is an SPS, the maximum index may be included in the SPS.

The maximum index is used to calculate a maximum number of zero or more merging motion vector prediction (MVP) candidates. The maximum number may be represented as MaxNumMergeCand. An index value of the maximum index may be in an index range of 0 to N2. The number N2 is an integer.

The maximum index may be an index sps_N2_minus_max_num_merge_cand when the maximum index is included in the SPS. The maximum index may be an index sps_six_minus_max_num_merge_cand when the maximum index is included in the SPS and the number N2 is equal to 6. When the maximum index is included in the PPS and the number N2 is equal to 5, the maximum index is an index pps_five_minus_max_num_merge_cand.

At block 430, the decoder module 124 determines, based on the maximum index, the maximum number of zero or more merging MVP candidates. The maximum number corresponds to the one or more image frames and has a number value in a value range including zero.

The maximum number may be calculated by subtracting the maximum index from the number N2. Therefore, the maximum number may be calculated by subtracting the maximum index from six when the number N2 is equal to 6. In other words, when the number N2 is equal to 6, the maximum number MaxNumMergeCand may be derived as follows:

$$MaxNumMergeCand = 6 - sps\_six\_minus\_max\_num\_merge\_cand$$

The index value of the maximum index may be in the index range of 0 to N2. Therefore, the value of the maximum number is in a value range of 0 to N2 and zero is included in the value range. The value of the maximum number is in a value range of 0 to 6 when the number N2 is equal to 6.

The decoder module 124 may determine whether the maximum number is included in the value range. The decoder module 124 may determine that the video data is not in compliance with the decoder module 124 when the decoder module 124 determines that the maximum number is excluded from the value range. Therefore, the decoder module 124 may output an error signal for the one or more image frames.

The decoder module 124 may determine whether the maximum index is included in the index range. The decoder module 124 may determine that the video data is not in compliance with the decoder module 124 when the decoder module 124 determines that the maximum index is excluded from the index range. Therefore, the decoder module 124 may output an error signal for the one or more image frames.

At block 440, the decoder module 124 reconstructs the one or more image frames based on the maximum number. With further reference to FIG. 1 and FIG. 2, the decoder module 124 may select a prediction mode for each of a plurality of image blocks in the one or more image frames from a plurality of mode candidates including the zero or more merging MVP candidates and determine a plurality of predicted blocks based on the prediction modes. The zero or more merging MVP candidates may include zero or more of a plurality of spatial MVP candidate, a plurality of temporal MVP candidates, a plurality of history-based MVP candidates, a plurality of pairwise average MVP candidates, and a zero MVs candidate. The spatial MVP candidates may be determined from motion vectors of spatial neighbor blocks, the temporal MVP candidates may be determined from motion vectors of collocated blocks, and the history-based MVP candidates may be determined from a first-in-first-out (FIFO) table.

The decoder module 124 may determine a plurality of residual components from the bitstream for each of the image blocks and add the residual components into a corresponding one of the predicted blocks to reconstruct the image blocks. The decoder module 124 may reconstruct all of the image frames for reconstructing the video images.

In a video coding standard, such as HEVC and VVC, the regular merge mode including the merging MVP candidates may be also enabled when the inter prediction mode is enabled. However, the process for decoding and constructing the merge candidates may be more complicated than the process for decoding the regular inter mode. Therefore, pipeline latency is also a problem and the regular merge mode may be directly disabled to reduce the pipeline latency.

The regular merge mode may be directly disabled by a high-level syntax, such as VPS, SPS, PPS. The maximum number may be equal to zero for directly disabling the regular merge mode when zero is included in the value range. Therefore, the regular merge mode is allowed to be disabled in the one or more image frames only by the maximum index since the first parameter set including the maximum index corresponds to the one or more image frames.

Figure 5:
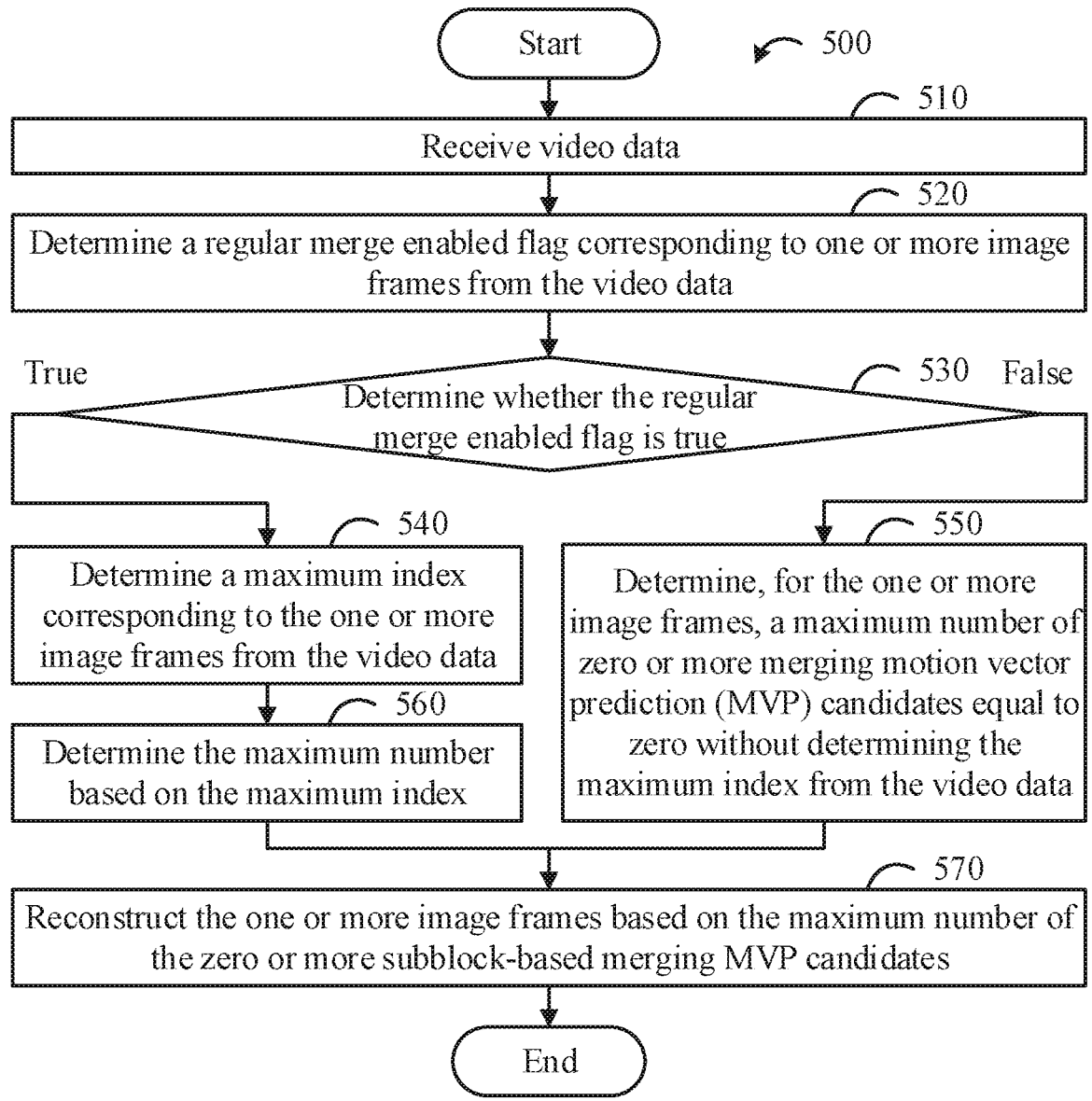
FIG. 5 is a flowchart illustrating a method for decoding video data by an electronic device, according to an implementation of the present disclosure.

FIG. 5 is a flowchart illustrating a method 500 for decoding video data by an electronic device, according to an implementation of the present disclosure. The method 500 is an example only, as there are a variety of ways to decode the video data.

The method 500 for decoding a bitstream and reconstructing a block unit may be performed using the configurations illustrated in FIG. 1 and FIG. 2, and various elements of these figures are referenced with regard to the method 500. Each block illustrated in FIG. 5 may represent one or more processes, methods, or subroutines performed.

The order of blocks in FIG. 5 is illustrative only and may change. Additional blocks may be added or fewer blocks may be utilized without departing from the present disclosure.

At block 510, the decoder module 124 receives video data. The video data may be a bitstream. With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

At block 520, the decoder module 124 determines a regular merge enabled flag corresponding to one or more image frames from the video data. With further reference to FIG. 1 and FIG. 2, the decoder module 124 may determine the one or more image frames from the bitstream and determine a first parameter set corresponding to the one or more image frames. The first parameter set may include a plurality of first prediction indications and a plurality of first partitioning indications. The bitstream may further include a second parameter set corresponding to one or more other image frames excluding the one or more image frames.

Both of the first parameter set and the second parameter set may be one of a VPS, an SPS, a PPS, and a PH. For example, the regular merge enabled flag may be a flag sps_regular_merge_enabled_flag when the regular merge enabled flag is included in the SPS.

The decoder module 124 may determine the regular merge enabled flag corresponding to the one or more image frames from the first parameter set of the bitstream. The regular merge enabled flag is used to determine whether a regular merge mode is enabled for the one or more image frames. A block-based syntax in the bitstream may further include a block-based regular merge flag for determining whether the regular merge mode is used for an image block divided from one of the one or more image frames when the regular merge enabled flag is equal to one.

The regular merge mode may include a plurality of merging MVP candidates. The merging MVP candidates may include zero or more of a plurality of spatial MVP candidate, a plurality of temporal MVP candidates, a plurality of history-based MVP candidates, a plurality of pairwise average MVP candidates, and a zero MVs candidate. The spatial MVP candidates may be determined from motion vectors of spatial neighbor blocks, the temporal MVP candidates may be determined from motion vectors of collocated blocks, and the history-based MVP candidates may be determined from a FIFO table.

The regular merge enabled flag is inferred to be equal to zero when the regular merge enabled flag is not present. In other words, the decoder module 124 may determine that the regular merge enabled flag is false when the regular merge enabled flag is not present.

At block 530, the decoder module 124 determines whether the regular merge enabled flag is true. The method 500 may proceed to block 540 when the decoder module 124 determines that the regular merge enabled flag is true. The method 500 may proceed to block 550 when the decoder module 124 determines the regular merge enabled flag is false.

The decoder module 124 determines that the regular merge enabled flag is true when the regular merge enabled flag is equal to one. The decoder module 124 determines that the regular merge enabled flag is false when the regular merge enabled flag is equal to zero. The regular merge enabled flag may be a flag sps_regular_merge_enabled_flag when the regular merge enabled flag is included in SPS.

At block 540, the decoder module 124 determines a maximum index corresponding to the one or more image frames from the video data. With further reference to FIG. 1 and FIG. 2, the decoder module 124 may determine the maximum index from the first parameter set corresponding to the one or more image frames when the regular merge enabled flag is true. Therefore, the maximum index also corresponds to the one or more image frames. The maximum index is included in the SPS when the regular merge enabled flag is included in the SPS.

The maximum index is used to calculate a maximum number of zero or more of the merging MVP candidates when the regular merge enabled flag is true. The maximum number may be represented as MaxNumMergeCand.

An index value of the maximum index may be in an index range of 0 to N3-P. The number N3 may be a first integer and the number P may be a second integer less than the number N3.

The maximum index may be an index sps_N3_minus_max_num_merge_cand when the maximum index is included in the SPS. The maximum index may be an index sps_six_minus_max_num_merge_cand when the maximum index is included in the SPS and the number N3 is equal to 6. When the maximum index is included in the PPS and the number N is equal to 5, the maximum index may be an index pps_five_minus_max_num_merge_cand.

The number P may be a positive integer. For example, the number P may be equal to one. When the number P is equal to one and the number N3 is equal to 6, the index value of the maximum index may be in the index range of 0 to 5.

At block 550, the decoder module 124 determines, for the one or more image frames, the maximum number of the zero or more merging MVP candidates equal to zero without determining the maximum index from the video data.

The maximum number is directly determined as zero without determining the maximum index from the video data when the regular merge enabled flag is false. The regular merge mode is disabled in the one or more image frames when the regular merge enabled flag is false. Therefore, all of the merging MVP candidates may not be used to predict all of a plurality of blocks divided from the one or more image frames, and the maximum number may be directly set as zero without further paring any flags or indices from the first parameter set when the regular merge enabled flag is false.

At block 560, the decoder module 124 determines the maximum number based on the maximum index. The maximum number may be calculated by subtracting the maximum index from the number N3 when the regular merge enabled flag is true. Therefore, the maximum number may be calculated by subtracting the maximum index from six when the regular merge enabled flag is true and the number N3 is equal to 6. In other words, when the regular merge enabled flag is true and the number N3 is equal to 6, the maximum number MaxNumMergeCand may be derived as follows:

MaxNumMergeCand=6−sps_six_minus_max_num_merge_cand

The index value of the maximum index may be in the index range of 0 to N3-P. Therefore, a value of the maximum number is in a value range of P to N3 when the regular merge enabled flag is true. The value of the maximum number is in a value range of 1 to 6 when the regular merge enabled flag is true, the number N3 is equal to 6, and the number P is equal to 1. Therefore, the maximum number may not be equal to zero when the regular merge enabled flag is true.

With reference to blocks 530-560 in FIG. 5, the maximum number MaxNumMergeCand may be derived as follows:

```
if( sps_regular_merge_enabled_flag )
    MaxNumMergeCand = 6 − sps_six_minus_max_num_merge_cand
else
    MaxNumMergeCand = 0
```

The decoder module 124 may determine whether the maximum number is included in the value range. The decoder module 124 may determine that the video data is not in compliance with the decoder module 124 when the decoder module 124 determines that the maximum number is excluded from the value range. Therefore, the decoder module 124 may output an error signal for the one or more image frames.

The decoder module 124 may determine whether the maximum index is included in the index range. The decoder module 124 may determine that the video data is not in compliance with the decoder module 124 when the decoder module 124 determines that the maximum index is excluded from the index range. Therefore, the decoder module 124 may output an error signal for the one or more image frames.

At block 570, the decoder module 124 reconstructs the one or more image frames based on the maximum number of the zero or more merging MVP candidates.

With further reference to FIG. 1 and FIG. 2, the decoder module 124 may select a prediction mode for each of a plurality of image blocks in the one or more image frames from a plurality of mode candidates including the zero or more merging MVP candidates and determine a plurality of predicted blocks based on the prediction modes. The decoder module 124 may determine a plurality of residual components from the bitstream for each of the image blocks and add the residual components into a corresponding one of the predicted blocks to reconstruct the image blocks. The decoder module 124 may reconstruct all of the image frames for reconstructing the video images.

The regular merge mode may be directly disabled by a high-level syntax, such as VPS, SPS, PPS, to reduce the pipeline latency. Therefore, the high-level syntax may include the regular merge enabled flag to determine whether the merging MVP candidates are enabled in one or more image frames. In addition, it is unnecessary that the value range of the maximum number includes zero to disable the regular merge mode since the regular merge mode may be disabled directly by the regular merge enabled flag. Therefore, the number P may be a positive integer, such as one.

Figure 6:
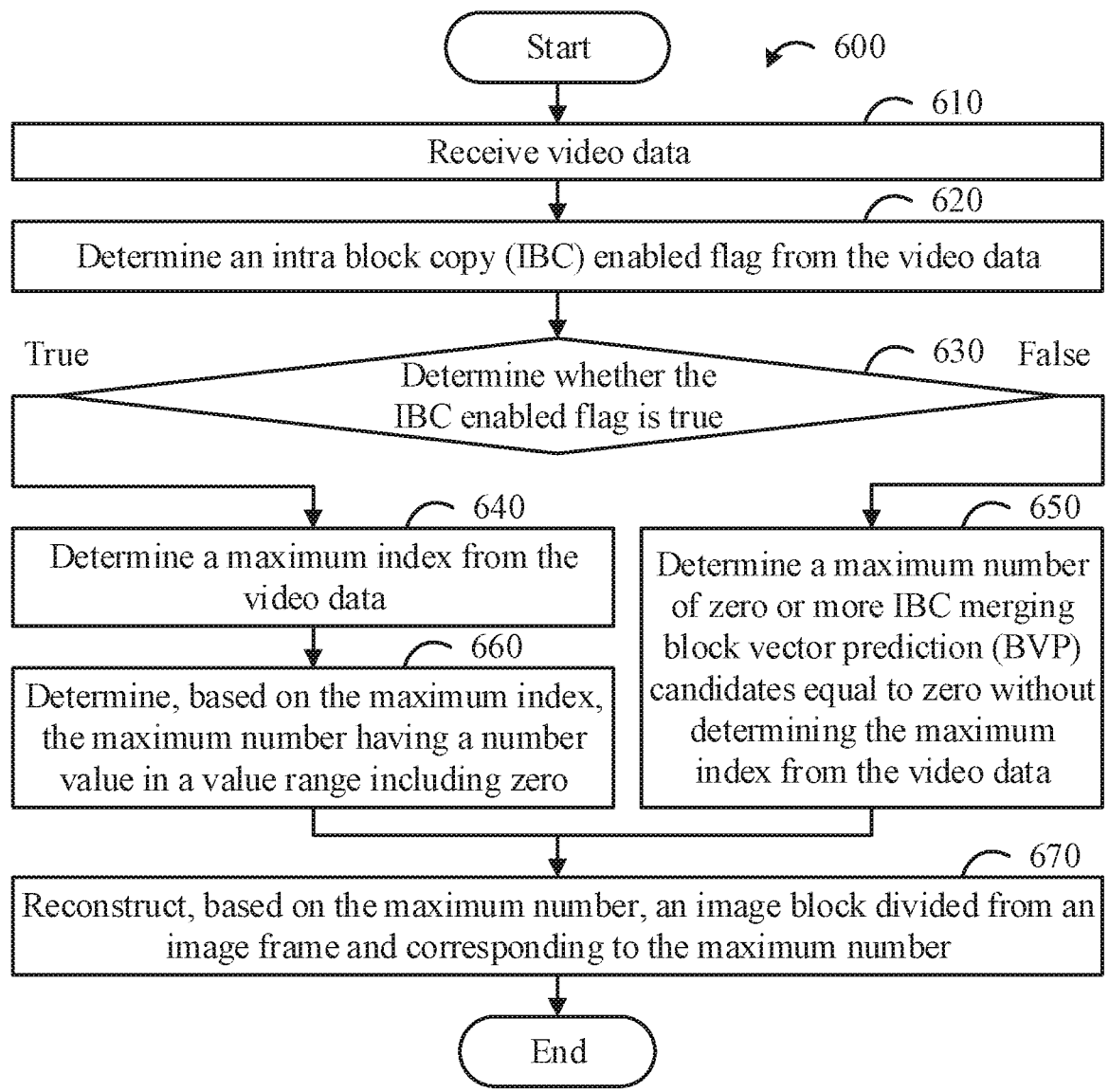
FIG. 6 is a flowchart illustrating a method for decoding video data by an electronic device, according to an implementation of the present disclosure.

FIG. 6 is a flowchart illustrating a method 600 for decoding video data by an electronic device, according to an implementation of the present disclosure. The method 600 is an example only, as there are a variety of ways to perform the method.

The method 600 for decoding a bitstream and reconstructing a block unit may be performed using the configurations illustrated in FIG. 1 and FIG. 2, and various elements of these figures are referenced with regard to the method 600. Each block illustrated in FIG. 6 may represent one or more processes, methods, or subroutines performed.

The order of blocks in FIG. 6 is illustrative only and may change. Additional blocks may be added or fewer blocks may be utilized without departing from the present disclosure.

At block 610, the decoder module 124 receives video data. The video data may be a bitstream. With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

At block 620, the decoder module 124 determines an intra block copy (IBC) enabled flag from the video data. With further reference to FIG. 1 and FIG. 2, the decoder module 124 may determine one or more image frames from the bitstream and determine a first parameter set corresponding to the one or more image frames. The first parameter set may be one of a VPS, an SPS, a PPS, and a PH. For example, the IBC enabled flag may be a flag sps_ibc_enabled_flag when the IBC enabled flag is included in the SPS.

The decoder module 124 may determine the IBC enabled flag from the bitstream. The decoder module 124 may determine the IBC enabled flag from the first parameter set in the bitstream. Since the first parameter set corresponds to the one or more image frames, the IBC enabled flag may also correspond to the one or more image frames.

The IBC enabled flag is used to determine an IBC prediction mode is enabled for the one or more image frames. The IBC prediction mode is implemented as a block level coding mode. Therefore, block matching is performed at the encoder to find the optimal block vector for each of a plurality of image blocks divided from the one or more image frames. A block vector is used to indicate a displacement from a current image block in a current image frame to a reference image block, which is already reconstructed inside the current picture.

At block 630, the decoder module 124 determines whether the IBC enabled flag is true. The method 600 may proceed to block 640 when the decoder module 124 determines that the IBC enabled flag is true. The method 600 may proceed to block 650 when the decoder module 124 determines the IBC enabled flag is false.

The decoder module 124 determines that the IBC enabled flag is true when the IBC enabled flag is equal to one. The decoder module 124 determines that the IBC enabled flag is false when the IBC enabled flag is equal to zero. The IBC enabled flag may be a flag sps_ibc_enabled_flag when the IBC enabled flag is included in SPS.

At block 640, the decoder module 124 determines a maximum index from the video data. With further reference to FIG. 1 and FIG. 2, the decoder module 124 may determine the maximum index from the video data when the IBC enabled flag is true. The maximum index may be included in one of a VPS, SPS, PPS, and PH.

The maximum index may be used to calculate a maximum number of zero or more IBC merging block vector prediction (BVP) candidates when the IBC enabled flag is true. The maximum number may be represented as MaxNumIbcMergeCand.

An index value of the maximum index may be in an index range of 0 to N4. The number N4 maybe an integer.

The maximum index may be an index sps_N4_minus_max_ibc_num_merge_cand when the maximum index is included in the SPS. The maximum index may be an index sps_six_minus_max_ibc_num_merge_cand when the maximum index is included in the SPS and the number N is equal to 6. When the maximum index is included in the PPS and the number N is equal to 5, the maximum index may be an index pps_five_minus_max_ibc_num_merge_cand.

At block 650, the decoder module 124 determines the maximum number of the zero or more IBC merging BVP candidates equal to zero without determining the maximum index from the video data. The maximum number may be calculated by subtracting the maximum index from the number N4. Therefore, the maximum number may be calculated by subtracting the maximum index from six, when the number N4 is equal to 6. In other words, when the number N4 is equal to 6, the maximum number MaxNumIbcMergeCand may be derived as follows:

$$MaxNumIbcMergeCand=6-sps\_six\_minus\_max\_ibc\_num\_merge\_cand$$

The index value of the maximum index may be in the index range of 0 to N4. Therefore, the value of the maximum number may be in a value range of 0 to N4 and zero is included in the value range. The value of the maximum number may be in a value range of 0 to 6 when the number N4 is equal to 6.

At block 660, the decoder module 124 determines the maximum number based on the maximum index and the maximum number has a number value in a value range including zero. The maximum number may be calculated by subtracting the maximum index from the number N4 when the IBC enabled flag is true. Therefore, the maximum number may be calculated by subtracting the maximum index from six when the IBC enabled flag is true and the number N4 is equal to 6. In other words, the maximum number MaxNumIbcMergeCand may be derived as follows:

$$MaxNumIbcMergeCand=6-sps\_six\_minus\_max\_ibc\_num\_merge\_cand$$

The index value of the maximum index may be in an index range of 0 to N4. Therefore, a value of the maximum number may be in a value range of 0 to N4 when the IBC enabled flag is true. Thus, zero is still included in the value range when the IBC enabled flag is true. In one implementation, the value of the maximum number may be in a value range of 0 to 6 when the number N4 is equal to 6.

With reference to blocks 630-660 in FIG. 6, the maximum number MaxNumIbcMergeCand may be derived as follows:

```
if( sps_ibc_enabled_flag )
    MaxNumIbcMergeCand = 6 − six_minus_max_ibc_num_merge_cand
else
    MaxNumIbcMergeCand = 0
```

The decoder module 124 may determine whether the maximum number is included in the value range. The decoder module 124 may determine that the video data is not in compliance with the decoder module 124 when the decoder module 124 determines that the maximum number is excluded from the value range. Therefore, the decoder module 124 may output an error signal.

The decoder module 124 may determine whether the maximum index is included in the index range when the IBC enabled flag is true. The decoder module 124 may determine that the video data is not in compliance with the decoder module 124 when the decoder module 124 determines that the maximum index is excluded from the index range. Therefore, the decoder module 124 may output an error signal.

At block 670, the decoder module 124 reconstructs, based on the maximum number, an image block divided from an image frame and corresponding to the maximum number.

With further reference to FIG. 1 and FIG. 2, the decoder module 124 may select a prediction mode for the image block divided from one of the one or more image frames from a plurality of mode candidates including the zero or more IBC merging BVP candidates and determine a predicted block based on the prediction mode. The zero or more IBC merging BVP candidates may include zero or more of a plurality of spatial IBC MVP candidates, a plurality of history-based MVP candidates, and a plurality of pairwise average MVP candidates.

The spatial MVP candidates may be determined from motion vectors of spatial neighbor blocks, and the history-based MVP candidates may be determined from a FIFO table. The decoder module 124 may determine a plurality of residual components from the bitstream for the image block and add the residual components into the predicted block to reconstruct the image block.

The decoder module 124 may reconstruct all of the image frames for reconstructing the video images. In a video coding standard, such as HEVC and VVC, the IBC prediction mode may include an IBC inter mode and IBC merge mode having the IBC merging candidates. However, the process for decoding and constructing the IBC merging BVP candidates may be more complicated than the process for decoding an IBC inter mode. Therefore, pipeline latency is also a problem and the IBC merge mode may be directly disabled to reduce the pipeline latency.

The IBC merge mode may be directly disabled by a high-level syntax, such as VPS, SPS, PPS. The maximum number may be allowed to be equal to zero for directly disabling the IBC merge mode when zero is included in the value range. Therefore, the IBC merge mode is allowed to be disabled in the one or more image frames only by one maximum index when both of the maximum index and the IBC enabled flag are included in the first parameter set.

For example, both the maximum index and the IBC enabled flag are included in the SPS. The IBC merge mode may be allowed to be disabled in a part of the one or more image frames by different maximum indices when a syntax level of the IBC enabled flag is higher than that of the maximum index. For example, the maximum index is included in PPS and the IBC enabled flag is included in the SPS.

Figure 7:
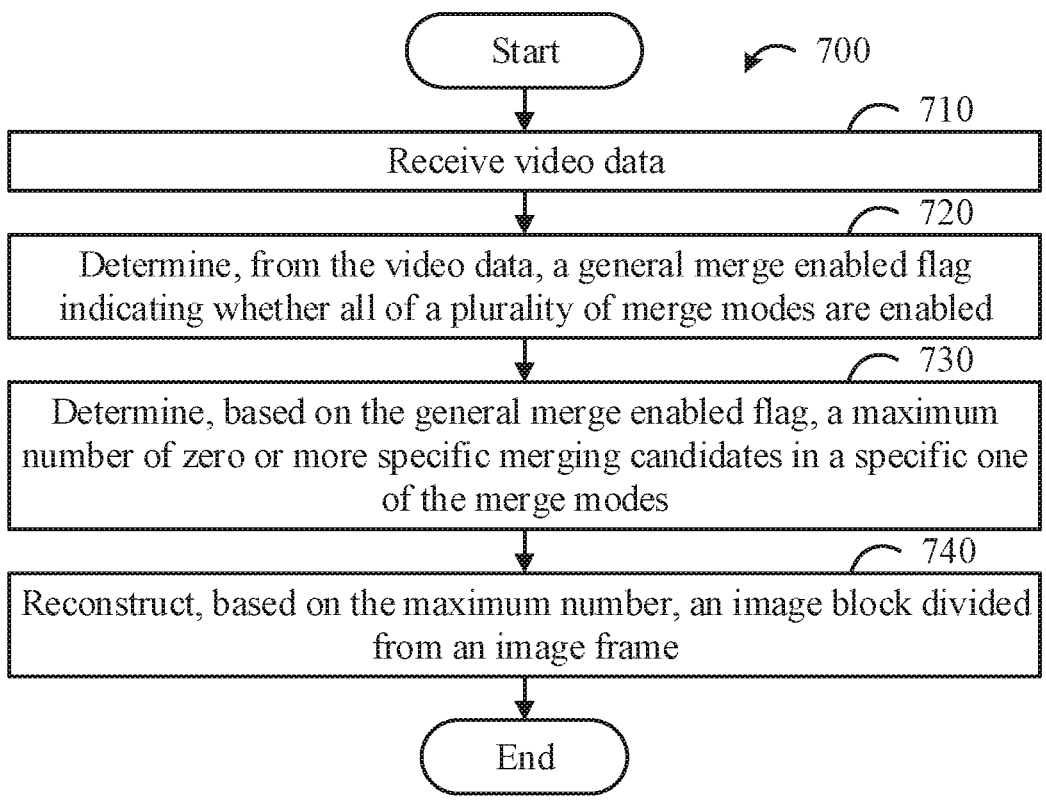
FIG. 7 is a flowchart o illustrating f a method for decoding video data by an electronic device, according to an implementation of the present disclosure.

FIG. 7 is a flowchart o illustrating f a method 700 for decoding video data by an electronic device, according to an implementation of the present disclosure. The method 700 is an example only, as there are a variety of ways to decode the video data.

The method 700 for decoding a bitstream and reconstructing a block unit may be performed using the configurations illustrated in FIG. 1 and FIG. 2, and various elements of these figures are referenced with regard to the method 700. Each block illustrated in FIG. 7 may represent one or more processes, methods, or subroutines performed.

The order of blocks in FIG. 7 is illustrative only and may change. Additional blocks may be added or fewer blocks may be utilized without departing from the present disclosure.

At block 710, the decoder module 124 receives video data. The video data may be a bitstream. With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

At block 720, the decoder module 124 determines, from the video data, a general merge enabled flag indicating whether all of a plurality of merge modes are enabled. With further reference to FIG. 1 and FIG. 2, the decoder module 124 may determine one or more image frames from the bitstream and determine a first parameter set corresponding to the one or more image frames. The first parameter set may be one of a VPS, an SPS, a PPS, and a PH.

The decoder module 124 may determine the general merge enabled flag from the bitstream. The decoder module 124 may determine the general merge enabled flag from the first parameter set in the bitstream. Since the first parameter set corresponds to the one or more image frames, the general merge enabled flag may also correspond to the one or more image frames.

The general merge enabled flag may be used to determine all of the merge modes enabled for the one or more image frames. The merge modes may include a regular merge mode, an affine merge mode, an IBC merge mode, and other merge modes.

All of the merge modes may be disabled in the one or more merge modes when the general merge enabled flag is false. The merge modes may be enabled in the one or more merge modes when the general merge enabled flag is true. Zero or more of the merge modes may be disabled in the one or more merge modes due to any other flags when the general merge enabled flag is true. For example, the IBC merge mode may be disabled due to an IBC enabled flag when the general merge enabled flag is true.

The general merge enabled flag is inferred to be equal to zero when the general merge enabled flag is not present. In other words, the decoder module 124 may determine that the general merge enabled flag is inferred to be equal to zero when the general merge enabled flag is not present.

At block 730, the decoder module 124 determines, based on the general merge enabled flag, a maximum number of zero or more specific merging candidates in a specific one of the merge modes. With further reference to FIG. 1 and FIG. 2, the decoder module 124 may determine, for the maximum number, a maximum index from the first parameter set corresponding to the one or more image frames. Therefore, the maximum index also corresponds to the one or more image frames. When the first parameter set is an SPS, the maximum index is included in the SPS. However, the maximum index may be equal to an inferred value when the maximum index is not present.

The maximum index is used to calculate the maximum number of the zero or more specific merging candidates in the specific merge mode. An index value of the maximum index may be in an index range so a value of the maximum number may be in a value range. The decoder module 124 may compare the maximum number with the value range or compare the maximum index with the index range for determining whether the video data is in compliance with the decoder module 124.

In one implementation, the maximum index may be used to calculate a maximum number of zero or more merging MVP candidates when the specific merge mode is the regular merge mode. The maximum number may be represented as MaxNumMergeCand. The maximum index may be an index sps_N5_minus_max_num_merge_cand when the maximum index is included in the SPS. The number N5 may be a positive integer.

The decoder module 124 may determine the maximum index for the regular merge mode from the video data when the general merge enabled flag is true. The decoder module 124 may determine the inferred value of the maximum index to be equal to the number N5 without parsing the maximum index from the video data when the general merge enabled flag is false.

The maximum index may be an index sps_six_minus_max_num_merge_cand when the maximum index is included in the SPS and the number N5 is equal to 6. The maximum number of the regular merge mode may be calculated by subtracting the maximum index from the number N5. Therefore, the maximum number MaxNumMergeCand may be derived as follows:

```
if( sps_general_merge_enabled_flag )
    MaxNumMergeCand = 6 - sps_six_minus_max_num_merge_cand
else
    MaxNumMergeCand = 0
```

In one implementation, the maximum index may be used to calculate a maximum number of zero or more subblock-based merging MVP candidates when the specific merge mode is the affine merge mode. The maximum number may be represented as MaxNumSubblockMergeCand. The maximum index may be an index sps_N6_minus_max_num_subblock_merge_cand when the maximum index is included in the SPS. The number N6 may be a positive integer.

The decoder module 124 may determine the maximum index from the video data when both an affine enabled flag and the general merge enabled flag are true. The decoder module 124 may determine the inferred value to be equal to the number N6 without parsing the maximum index when the affine enabled flag or the general merge mode is false. The maximum index of the affine merge mode may be an index sps_five_minus_max_num_subblock_merge_cand when the maximum index is included in the SPS and the number N6 is equal to 5.

The maximum number of the affine merge mode may be calculated by subtracting the maximum index from the number N6 when the affine enabled flag is true. The maximum number of the affine merge mode may be calculated based on the general merge enabled flag, a subblock-based temporal MVP (sbTMVP) flag, and a temporal MVP (TMVP) flag when the affine enabled flag is false. For example, the maximum number MaxNumSubblockMergeCand may be derived as follows:

```
if( sps_affine_enabled_flag )
    MaxNumSubblockMergeCand = 5 - sps_five_minus_max_num_subblock_merge_cand
else
    MaxNumSubblockMergeCand=sps_general_merge_enable_flag&&sps_sbtmvp_enabled_flag
        &&ph_temporal_mvp_enable_flag
```

In one implementation, the maximum index may be used to calculate a maximum number of zero or more IBC merging BVP candidates when the specific merge mode is the IBC merge mode. The maximum number may be represented as MaxNumIbcMergeCand. The maximum index may be an index sps_N7_minus_max_ibc_num_merge_cand when the maximum index is included in the SPS. The number N7 may be a positive integer.

The decoder module 124 may determine the maximum index from the video data when both an IBC enabled flag and the general merge enabled flag are true. The decoder module 124 may determine the inferred value to be equal to the number N7 without parsing the maximum index when the IBC enabled flag or the general merge mode is false.

The maximum index of the IBC merge mode may be an index sps_six_minus_max_ibc_num_merge_cand when the maximum index is included in the SPS and the number N7 is equal to 6. The maximum number of the IBC merge mode may be calculated by subtracting the maximum index from the number N7 when the IBC enabled flag is true. The maximum number of the IBC merge mode may be determined based on the general merge enabled flag when the affine enabled flag is false. For example, the maximum number MaxNumIbcMergeCand may be derived as follows:

```
if( sps_ibc_enabled_flag )
    MaxNumIbcMergeCand = 6 - sps_six_minus_max_ibc_num_merge_cand
else
    MaxNumIbcMergeCand = sps_general_merge_enable_flag
```

In another implementation, the decoder module 124 may determine, based on the general merge enabled flag, more than one maximum number respectively for different merge modes according to at least two of the first to the third implementations in the method 700. For example, the decoder module 124 may determine, based on the general merge enabled flag, the maximum number of the regular merge mode and the maximum number of the IBC merge mode.

At block 740, the decoder module 124 reconstructs, based on the maximum number, an image block divided from an image frame. With further reference to FIG. 1 and FIG. 2, the decoder module 124 may select a prediction mode for each of a plurality of image blocks in the one or more image frames from a plurality of mode candidates including the zero or more specific merging candidates and determine a plurality of predicted blocks based on the prediction modes. The decoder module 124 may determine a plurality of residual components from the bitstream for each of the image blocks and add the residual components into a corresponding one of the predicted blocks to reconstruct the image blocks. The decoder module 124 may reconstruct all of the image frames for reconstructing the video images.

All of the merge modes may be directly disabled by a high-level syntax, such as VPS, SPS, PPS, to reduce the pipeline latency. Therefore, the high-level syntax may include the general merge enabled flag to determine whether all of the merge modes are enabled in one or more image frames. In addition, each maximum number for the merge modes may be controlled by the general merge enabled flag for further increasing the coding efficiency.

Figure 8:
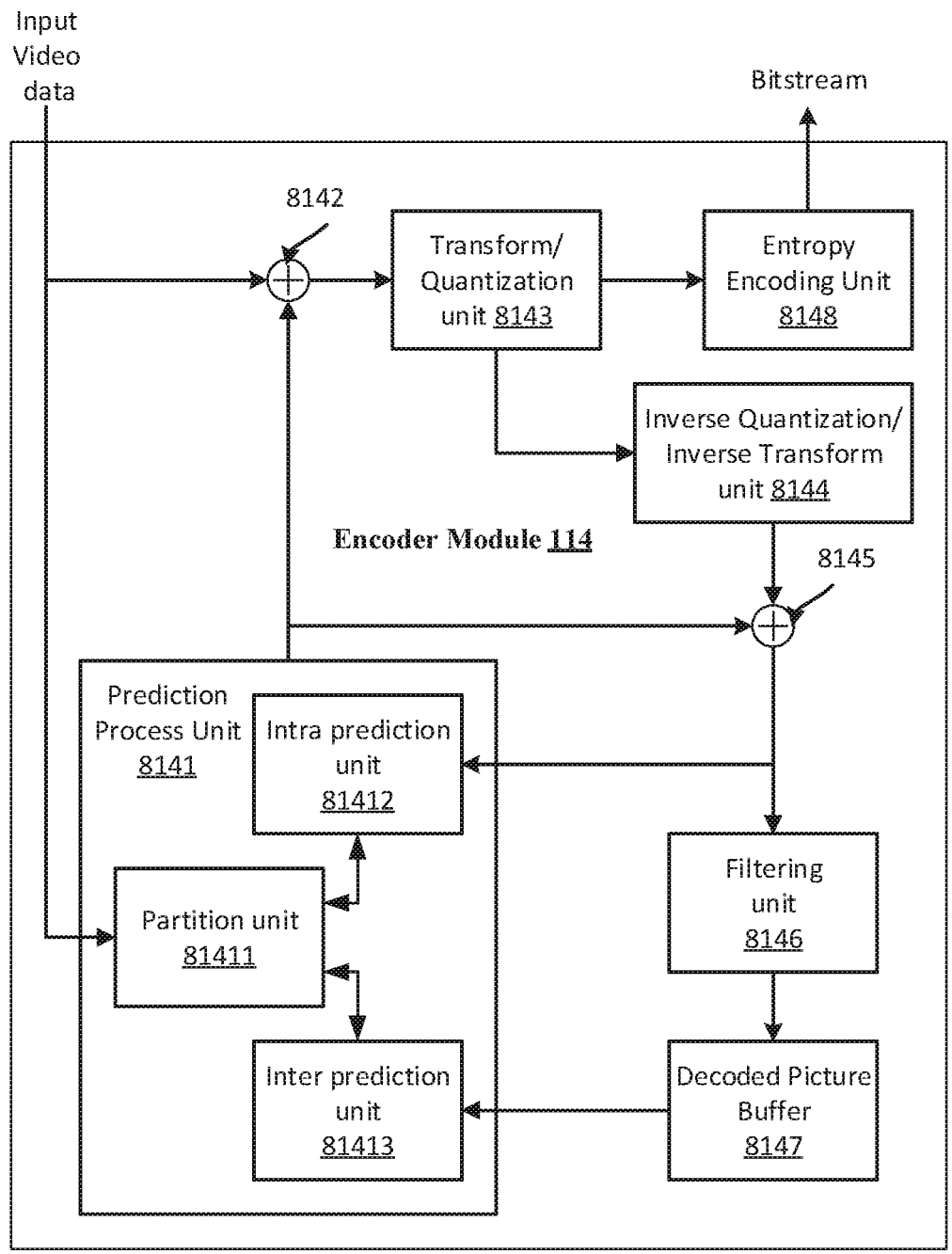
FIG. 8 is a block diagram illustrating an encoder module of an electronic device illustrated in FIG. 1, according to an implementation of the present disclosure.

FIG. 8 is a block diagram illustrating an encoder module 114 of an electronic device 110 illustrated in FIG. 1, according to an implementation of the present disclosure. The encoder module 114 may include a prediction processor (e.g., prediction process unit 8141), at least a first summer (e.g., first summer 8142) and a second summer (e.g., second summer 8145), a transform/quantization processor (e.g., transform/quantization unit 8143), an inverse quantization/inverse transform processor (e.g., inverse quantization/inverse transform unit 8144), a filter (e.g., filtering unit 8146), a decoded picture buffer (e.g., decoded picture buffer 8147), and an entropy encoder (e.g., entropy encoding unit 8148). The prediction process unit 8141 of the encoder module 114 may further include a partition processor (e.g., partition unit 81411), an intra prediction processor (e.g., intra prediction unit 81412), and an inter prediction processor (e.g., inter prediction unit 81413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 8141 may receive a current image block of a specific one of the image frames. The current image block may be the luminance block or one of the chrominance blocks in the specific image frame.

The partition unit 81411 may divide the current image block into multiple block units. The intra prediction unit 81412 may perform intra-predictive coding of a current block unit relative to one or more neighboring blocks in the same frame as the current block unit in order to provide spatial prediction. The inter prediction unit 81413 may perform inter-predictive coding of the current block unit relative to one or more blocks in one or more reference image blocks to provide temporal prediction.

The prediction process unit 8141 may select one of the coding results generated by the intra prediction unit 81412 and the inter prediction unit 81413 based on a mode selection method, such as a cost function. The mode selection method may be a rate-distortion optimization (RDO) process.

The prediction process unit 8141 may determine the selected coding result and provide a predicted block corresponding to the selected coding result to the first summer 8142 for generating a residual block and to the second summer 8145 for reconstructing the encoded block unit. The prediction process unit 8141 may further provide syntax elements, such as motion vectors, intra mode indicators, partition information, and other syntax information, to the entropy encoding unit 8148.

The intra prediction unit 81412 may intra predict the current block unit. The intra prediction unit 81412 may determine an intra prediction mode directed toward a reconstructed sample neighboring the current block unit in order to encode the current block unit.

The intra prediction unit 81412 may encode the current block unit using various intra prediction modes. The intra prediction unit 81412 or the prediction process unit 8141 may select an appropriate intra prediction mode from the selected modes. The intra prediction unit 81412 may encode the current block unit using a cross component prediction mode to predict one of the two chroma components of the current block unit based on the luma components of the current block unit. The intra prediction unit 81412 may predict a first one of the two chroma components of the current block unit based on the second of the two chroma components of the current block unit.

The inter prediction unit 81413 may inter predict the current block unit as an alternative to the intra prediction performed by the intra prediction unit 81412. The inter prediction unit 81413 may perform motion estimation to estimate motion of the current block unit for generating a motion vector.

The motion vector may indicate a displacement of the current block unit within the current image block relative to a reference block unit within a reference image block. The inter prediction unit 81413 may receive at least one reference image block stored in the decoded picture buffer 8147 and estimate the motion based on the received reference image blocks to generate the motion vector.

The first summer 8142 may generate the residual block by subtracting the prediction block determined by the prediction process unit 8141 from the original current block unit. The first summer 8142 may represent the component or components that perform this subtraction.

The transform/quantization unit 8143 may apply a transform to the residual block in order to generate a residual transform coefficient and then quantize the residual transform coefficients to further reduce bit rate. The transform may be one of a DCT, DST, AMT, MDNSST, HyGT, signal-dependent transform, KLT, wavelet transform, integer transform, sub-band transform, or a conceptually similar transform.

The transform may convert the residual information from a pixel value domain to a transform domain, such as a frequency domain. The degree of quantization may be modified by adjusting a quantization parameter.

The transform/quantization unit 8143 may perform a scan of the matrix including the quantized transform coefficients. Alternatively, the entropy encoding unit 8148 may perform the scan.

The entropy encoding unit 8148 may receive a plurality of syntax elements from the prediction process unit 8141 and the transform/quantization unit 8143 including a quantization parameter, transform data, motion vectors, intra modes, partition information, and other syntax information. The entropy encoding unit 8148 may encode the syntax elements into the bitstream.

The entropy encoding unit 8148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120 in FIG. 1) or archived for later transmission or retrieval.

The inverse quantization/inverse transform unit 8144 may apply inverse quantization and inverse transformation to reconstruct the residual block in the pixel domain for later use as a reference block. The second summer 8145 may add the reconstructed residual block to the prediction block provided from the prediction process unit 8141 in order to produce a reconstructed block for storage in the decoded picture buffer 8147.

The filtering unit 8146 may include a deblocking filter, an SAO filter, a bilateral filter, and/or an ALF to remove blocking artifacts from the reconstructed block. Additional filters (in loop or post loop) may be used in addition to the deblocking filter, the SAO filter, the bilateral filter, and the ALF. Such filters are not illustrated for brevity and may filter the output of the second summer 8145.

The decoded picture buffer 8147 may be a reference picture memory that stores the reference block for use by the encoder module 114 to encode video, such as in intra or inter coding modes. The decoded picture buffer 8147 may include a variety of memory devices, such as DRAM (including SDRAM, MRAM, RRAM), or other types of memory devices. The decoded picture buffer 8147 may be on-chip with other components of the encoder module 114 or off-chip relative to those components.

The encoder module 114 may receive video data and use a plurality of prediction modes to predict a plurality of image frames in the video data. The prediction modes may include a plurality of merge modes having a plurality of merging candidates. The encoder module 114 may signal, based on the prediction results, at least one of an affine enabled flag in FIG. 3, a regular merge enabled flag in FIG. 5, an IBC enabled flag in FIG. 6, and a general merge enabled flag in FIG. 7 for determining whether a corresponding mode is enabled for one or more image frames.

The encoder module 114 may signal, based on the prediction results, a maximum index for the method 300-700 in FIGS. 3-7 for determining a corresponding maximum number. In addition, with reference to FIG. 3, the encoder module 114 may signal a subblock-based temporal MVP flag and a temporal MVP flag for determining the maximum number of the affine merging MVP candidates. Then, the encoder module 114 may add the encoded data including the flags and the indices into the bitstream for providing to the decoder module 124.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of encoding video data performed by an electronic device, the method comprising:
   receiving the video data;
   determining whether an affine enabled flag corresponding to one or more image frames included in the video data is true;
   determining a maximum number of zero or more sub-block-based merging motion vector prediction (MVP) candidates corresponding to the one or more image frames when the affine enabled flag is true, wherein:
      the maximum number of the zero or more subblock-based merging MVP candidates is in a number range of K to N, N being a first integer, and K being a second integer less than N, and
      the maximum number of the zero or more subblock-based merging MVP candidates is in a number range of 1 to N when K is 1;
   determining that a maximum index is in an index range of 0 to N-K and generated by subtracting the maximum number of the zero or more subblock-based merging MVP candidates from N when the affine enabled flag is true, wherein an index value of the maximum index is in an index range of 0 to N-1 when K is 1; and
   signaling the maximum index into a bitstream for the video data.

2. The method according to claim 1, wherein N is five.

3. The method according to claim 1, wherein:
   the affine enabled flag and the maximum index are signaled in a sequence parameter set (SPS) of the bitstream,
   each of the one or more image frames is reconstructed based on the SPS, and
   at least one of the one or more image frames is reconstructed based on a picture header of the bitstream.

4. The method according to claim 1, wherein the maximum number of the zero or more subblock-based merging MVP candidates is in a number range of K to N when K is different from 1.

5. An electronic device for encoding video data, the electronic device comprising:
   at least one processor; and
   at least one storage device coupled to the at least one processor and storing computer-executable instructions which, when executed by the at least one processor, cause the electronic device to:
   receive the video data;
   determine whether an affine enabled flag corresponding to one or more image frames included in the video data is true;
   determine a maximum number of zero or more sub-block-based merging motion vector prediction (MVP) candidates corresponding to the one or more image frames when the affine enabled flag is true, wherein:
      the maximum number of the zero or more subblock-based merging MVP candidates is in a number range of K to N, N being a first integer, and K being a second integer less than N, and the maximum number of the zero or more subblock-based merging MVP candidates is in a number range of 1 to N when K is 1;

determine that a maximum index is in an index range of 0 to N-K and generated by subtracting the maximum number of the zero or more subblock-based merging MVP candidates from N when the affine enabled flag is true, wherein an index value of the maximum index is in an index range of 0 to N-1 when K is 1; and signal the maximum index into a bitstream for the video data.

6. The electronic device according to claim 5, wherein N is five.

7. The electronic device according to claim 5, wherein:
the affine enabled flag and the maximum index are signaled in a sequence parameter set (SPS) of the bitstream, each of the one or more image frames is reconstructed based on the SPS, and at least one of the one or more image frames is reconstructed based on a picture header of the bitstream.

8. The electronic device according to claim 5, wherein the maximum number of the zero or more subblock-based merging MVP candidates is in a number range of K to N when K is different from 1.

9. A method of encoding video data by an electronic device, the method comprising:

receiving the video data;

determining a maximum number of zero or more subblock-based merging motion vector prediction (MVP) candidates corresponding to one or more image frames included in the video data, wherein the maximum number of the zero or more subblock-based merging MVP candidates is in a number range of K to N, N being a first integer, and K being a second integer less than N;

determining a maximum index by subtracting the maximum number of the zero or more subblock-based merging MVP candidates from N, wherein the maximum number of the zero or more subblock-based merging MVP candidates is in a number range of 1 to N and an index value of the maximum index is in an index range of 0 to N-1 when K is 1; and signaling the maximum index into a bitstream for the video data.

10. The method according to claim 9, further comprising:

determining an affine enabled flag corresponding to the one or more image frames, wherein:

the maximum index is signaled into the bitstream when the affine enabled flag is true.

* * * * *